June 14, 1932.   R. A. HOOD ET AL   1,863,136
MILK BOTTLE CARRIER
Filed June 15, 1929
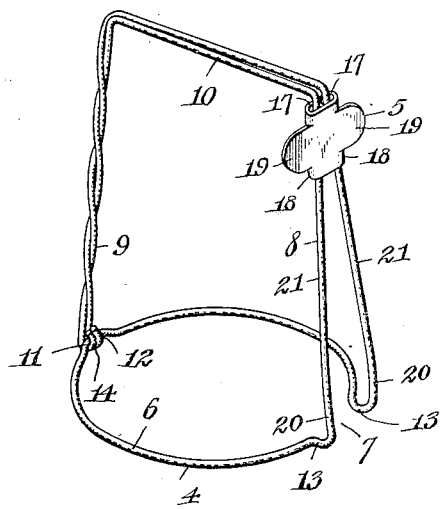
Fig.1.
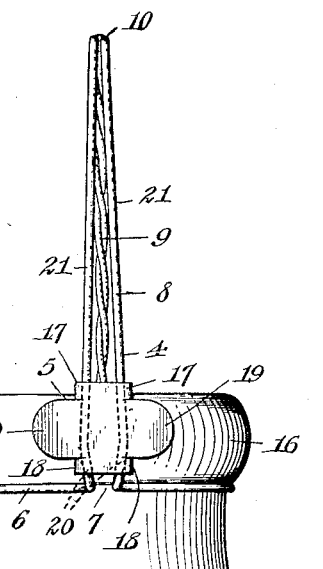
Fig.2.
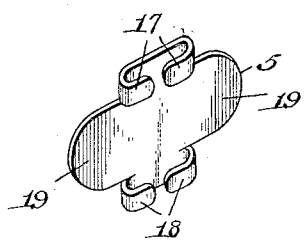
Fig.3.
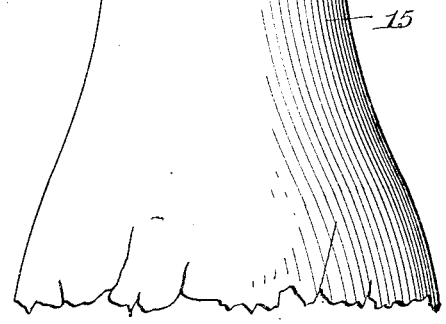
Robert A. Hood,
Joseph J. Shicktuna, Inventors.
By Emil Kuhart
Attorney.
Witness:
J. J. Oberst.

Patented June 14, 1932

1,863,136

UNITED STATES PATENT OFFICE

ROBERT A. HOOD AND JOSEPH J. SHICKLUNA, OF BUFFALO, NEW YORK

MILK BOTTLE CARRIER

Application filed June 15, 1929. Serial No. 371,283.

Our invention relates to improvements in a milk bottle carrier; it being particularly designed for use in delivering milk to customers, or for use by customers purchasing milk from a store or dealer and carrying the same to the place of consumption.

The primary object of our invention is the provision of a milk bottle carrier of simple and inexpensive construction, which can be easily applied to a milk bottle and tightened around the neck of the same to assure a convenient support for the bottle and to enable the bottle to be conveniently carried from one place to another.

A further object of our invention is the provision of a milk bottle carrier of this type, which in the main is formed of a wire having portions thereof movable toward and from each other into and out of bottle-clamping position, the wire being preferably resilient so that such portions are normally maintained in unclamping position and necessitate the use of attached clamping means to draw them toward each other so as to clamp the device around the neck of a bottle under the usual flange at the upper end thereof.

A still further object of our invention is the provision of a milk bottle carrier which can be sold to dealers or distributers of milk for advertising purposes, the carrier being comparatively cheap so that it can be given away; for example, when returning a certain number of empty bottles to the dealer or distributer, thus making it an object to return empty bottles and aiding in the economical distribution of milk, due to the diminished cost in maintaining the necessary supply of bottles for distribution.

With the above and other objects in view, our invention consists in the novel features of construction, and in the arrangement and combination of parts to be hereinafter described and more particularly pointed out in the subjoined claims.

In the drawing:—

Fig. 1 is a perspective view of the complete carrier.

Fig. 2 is a side elevation of the upper portion of a bottle showing the carrier applied thereto.

Fig. 3 is a detached perspective view of the slidable clamp member by means of which the wire or main portion of the carrier is firmly clamped around the neck of a bottle.

The main or body portion of the carrier is designated by the numeral 4 and the clamp member slidable along diverging spaced parts of said main or body portion by the numeral 5.

The main or body portion of the device comprises a clamping loop 6 having a peripheral opening 7, two side members 8 and 9, and a handle member 10. This main or body portion is preferably formed of a single length of resilient wire of suitable gage to provide the necessary rigidity, and to enable a bottle to be conveniently carried without the handle of the device pressing into the flesh of the fingers or hand. The wire from which this main or body portion is formed is curved into circular formation midlength between its ends to form the open clamping loop 6, and this loop has a comparatively small peripheral extension 11 at a point diametrically opposite the peripheral opening 7 therein, said extension being formed by bending the wire of the loop outwardly to form a recess 12 on the inner side of the loop.

At the peripheral opening 7 of the loop, the wire is in the form of two distinct strands, which are directed outwardly a short distance in substantially radial lines at opposite sides of the peripheral opening 7, as shown at 13, thence upwardly a short distance in diverging relation, as at 20, and thence in converging relation, as at 21, to form the side member 8, at the upper end of which member the strands of wire are directed diametrically over the loop 6 in spaced relation thereto to form the handle member 10, and finally twisted together and bent downwardly from said handle member to the peripheral extension 11 of said clamping loop to form the side member 9, the extremities of the strands of wire being looped around said extension, as at 14. The looped extremity of said side member 9 lies within the recess 12 in said open loop so as to avoid all projecting parts within the loop. The loop therefore has no projecting portions on its inner side and lies in contact at all points against the neck of the bottle 15 underneath the flange 16 with which milk bottles are usually provided.

The two strands of wire at the handle portion are arranged side by side, the under sides of which are presented to the hand or fingers when taking hold of the carrier, thus presenting a comparatively wide surface on the under side of the handle which cannot press into the flesh of the hand or fingers under the weight of a milk bottle carried by the device. By reason of the handle being positioned above the open clamping loop 6 and in a plane passing diametrically through said loop, a milk bottle having the device applied thereto can be carried in a perfectly balanced position.

It is to be noted that the portions of the two strands of wire forming the side member 8 lie in contact with or closely approach each other at their upper ends and are gradually separated downwardly to points near the peripheral opening of the clamping loop 6, from which they gradually approach each other. These wires therefore are made diverging in a downward direction along the main portion of the side member 8.

The clamp member 5 is in the form of a slide or runner having parts thereof embracing the two strands of wire forming the side member 8. In preferred form, this clamp member is stamped out of sheet metal having a pair of recurved lugs 17, 18 at its upper and lower ends, respectively; said lugs being bent behind the two strands of wire of said side member 8 so that said clamp member, while movable along said side member, is not removable therefrom. The portion of the clamp member between said two pairs of lugs is laterally extended and enlarged, as at 19, to provide an outer surface of sufficient area to receive the name of the dealer or distributer of the milk, or this surface may have any other advertising matter printed, stamped, or otherwise applied thereto. Due to the two strands of wire which form the side member 8 being made diverging downwardly along the major portion of their lengths and the two lugs of each pair on the clamp member being spaced apart, the two strands of wire are gradually moved into closer relation to each other when the clamp member is moved downward along said side member, thus reducing the size or diameter of the open loop 6 and retaining said strands and the loop in such condition. When this clamp member is moved upwardly along the two strands of wire, the resiliency of the wire will cause the loop to open up to a greater degree and consequently increase in diameter and said wire strands will separate gradually from their lower ends upwardly. The side member 8 is consequently made yielding under the action of the clamp member.

When moving the clamp member 5 downwardly on the side member to tighten the clamping loop 6 around the neck of the bottle, the lower pair of lugs 18 on said clamp member ride over and downwardly beyond the points of connection of the short upwardly-diverging portions 20 of the two strands of wire forming said side member with the upwardly-converging portions. Therefore, after thus positioning said clamp member it cannot accidentally move upwardly on the side member 8, except under pressure exerted manually in such direction. Assurance is therefore had that when the holder is clamped around the neck of the bottle it will remain firmly clamped until released by manual effort.

While the two strands of the side member 8 have both upwardly-diverging and upwardly-converging portions, the upwardly-diverging portions are comparatively short, and broadly considered therefor, the two strands of the side member may be referred to as upwardly-converging or downwardly-diverging wires or strands.

The device may be said to comprise an expansible and contractable loop adapted to be placed around the neck of a bottle underneath the flange, usually provided at the upper end thereof, two side members extending upwardly from the loop at diametrically opposite points thereof and a handle member connecting the upper ends of said side members; one side member extending upwardly from the peripheral opening 7 of the open loop and comprising downwardly-diverging portions of the two strands or stretches of wire, and the other, twisted portions thereof.

It may here be stated that the short outwardly-directed portions 13 of the wire may be dispensed with, but these outwardly-directed portions are preferably employed due to the fact that the side member 8 of the device, rising from these outwardly-directed portions, will clear the flange 16 at the upper end of the bottle and assure a firm seating of the wire forming the open loop against the neck of the bottle directly underneath said flange when the clamp member 5 is drawn downwardly along the yielding side member, or more particularly, along the two stretches of wire forming said side member.

Attention is invited to the fact that due to the wire being secured to the peripheral extension 11 of the loop 6 at a point opposite the peripheral opening 7 thereof, the side member formed of the twisted strands or portions of the wire will clear the flange of the bottle without resorting to any bending of said side member where it is connected to said loop.

While we have described this invention for use in connection with a milk bottle, it will be apparent that it may be applied to any other type of bottle or container having a flange or other part serving as such and capable of sustaining the bottle or container on the open loop of the device.

Having thus described our invention, what we claim is:—

1. A bottle carrier formed of a single piece of resilient wire bent into a loop between its ends and having a peripheral opening, thence into an arm by portions of the wire extended upwardly from the peripheral opening of said loop, thence into a handle extending diametrically over the loop and in spaced relation thereto, and finally into a second side member extending downwardly from said handle to said loop and being secured to the loop at a point diametrically opposite the peripheral opening therein, and means slidable along portions of said wire to cause said loop to be clamped around the neck of a milk bottle underneath the flange thereof.

2. A bottle carrier, formed of a resilient wire fashioned into a clamping loop having a peripheral opening, opposite side members extending upwardly from diametrically opposite points of said loop, one of said side members only being formed by two strands or stretches of the wire extending upwardly from opposite sides of the peripheral opening in said loop and disposed in gradually widened relation from the upper ends to the lower ends thereof, a handle connecting the upper ends of said side members, and a clamp device formed of sheet material having lugs at its upper and lower ends bent around the wires of the side member extending upwardly from the peripheral opening in said loop, said clamp device bringing the wires of said last-mentioned side member in closer relation to cause the open loop to be reduced in diameter upon moving said clamp device downwardly, and the resiliency of said wire tending to open said loop to a greater degree and increase the diameter of said loop when moving the clamp device upwardly on the wires of said last-mentioned side member.

3. A bottle carrier having a main portion formed of a single piece of resilient wire curved upon itself centrally between its ends to provide a clamping loop having a peripheral opening and having said loop extended outwardly at a point diametrically opposite its peripheral opening to form a recess on the inner side thereof, the wire being thence directed upwardly in two strands from opposite sides of said peripheral opening to form a yielding side member, thence transversely above said loop to form a handle member, thence downwardly and in twisted form to form a second side member, and finally being looped around the outward extension of said loop to fasten said second side member to said loop, the two strands of wire forming said yielding side member being disposed in downwardly diverging relation, and a clamp device formed of sheet material having retainer lugs at its upper and lower ends curved inwardly upon themselves and behind the two strands of wire forming said yielding side member, said clamping device serving to diminish the diameter of said open loop when moved downwardly along said yielding side member and serving to allow the resiliency of said wire to increase the diameter of said loop when moving it upwardly along said yielding side member.

4. A bottle carrier formed of a single piece of resilient wire curved upon itself centrally between its ends to form a clamping loop having a peripheral opening and having at a point between its ends an outward extension to form a recess on the inner side of said loop, the two strands of wires thus created being extended outwardly at the peripheral opening of said loop and thence directed upwardly to form a yielding side member having downwardly-diverging wire parts, the two strands of wire being thence directed side by side transversely above the open loop, and thence extended downwardly in twisted form to the recessed portion of said loop for connection thereto, and a clamp member formed of sheet material having a pair of retainer lugs bent inwardly and toward each other at its upper and lower ends to embrace the diverging parts of said yielding side member, said clamp member serving to bring the diverging parts of said yielding side member into closer relation to reduce the diameter of said loop upon movement of said clamp member downwardly along said side member, the resiliency of the wire serving to separate said diverging parts so as to increase the diameter of said loop when moving said clamp member upwardly along said yielding side member.

5. A bottle carrier, comprising an open loop having two upstanding side members and a handle member connecting the upper ends of said side members, one of said side members comprising two parts diverging downwardly from the handle to a point near the opening of said loop, and thence being made downwardly converging to said opening, and a clamping device movable along said parts to draw them into closer relation for the purpose of reducing the diameter of said open loop and to retain said parts in such relation.

6. A bottle carrier, comprising an open loop having two upstanding side members and a handle member connecting the upper ends of said side members, one of said members comprising two parts diverging downwardly from the handle to a point near the opening of said loop, and thence being made downwardly-converging to said opening, and a clamping device movable along said parts and having two pairs of lugs engaging said parts, one pair being disposed above the other, the lower of said two pairs of lugs being adapted to engage the downwardly-converging portions of said parts and both pairs of lugs being adapted to draw said parts into closer relation for the purpose of reducing the diameter of said open loop, said lower pair of lugs serving when engaging the downwardly-converging portions of said parts to retain the latter in said last-mentioned relation.

In testimony whereof, we affix our signatures.

ROBERT A. HOOD.
JOSEPH J. SHICKLUNA.